United States Patent [19]
Britt et al.

[11] Patent Number: 5,415,377
[45] Date of Patent: May 16, 1995

[54] SHEAVE ASSEMBLY FOR A TIRE LIFT/CARRIER WINCH

[75] Inventors: Donald R. Britt, Grand Rapids; Donald R. Rempinski, Grand Haven; Mikhail Livshits, Kentwood; David M. Sovis, Novi, all of Mich.

[73] Assignee: Sparton Corporation, Jackson, Mich.

[21] Appl. No.: 995,330

[22] Filed: Dec. 23, 1992

Related U.S. Application Data

[63] Continuation of Ser. No. 728,815, Jul. 11, 1991, abandoned, which is a continuation of Ser. No. 369,103, Jun. 21, 1989, abandoned.

[51] Int. Cl.$^6$ .......................... B66D 1/00; B66D 5/14; B65H 75/18
[52] U.S. Cl. .................... 254/323; 254/378; 242/610.6; 242/587.1
[58] Field of Search ............... 254/323, 344, 324, 325, 254/326, 378; 242/117, 610.6, 578.1

[56] References Cited

U.S. PATENT DOCUMENTS

| | | | |
|---|---|---|---|
| 2,924,430 | 2/1960 | Smith | 254/344 |
| 2,989,288 | 6/1961 | Smith | 254/344 |
| 3,310,290 | 3/1967 | Workman | 254/378 |
| 4,059,197 | 11/1977 | Iida | 254/323 |
| 4,166,311 | 9/1979 | Lindstrand | 29/33 |
| 4,421,299 | 12/1983 | Hess | 254/342 |
| 4,535,973 | 8/1985 | Dorr et al. | 254/323 |
| 4,544,136 | 10/1985 | Denman et al. | 254/323 |
| 4,625,947 | 12/1986 | Denman et al. | 254/323 |
| 4,736,929 | 4/1988 | McMorris | 254/344 |

*Primary Examiner*—Daniel P. Stodola
*Assistant Examiner*—Michael R. Mansen
*Attorney, Agent, or Firm*—Reising, Ethington, Barnard, Perry & Milton

[57] ABSTRACT

A two-piece sheave assembly is provided for a tire lift/carrier winch. The sheave assembly includes a molded plastic, one-piece sheave component that is molded to include a first sheave side plate, an integral sheave center hub with a cable-wrapping track thereon and optionally an integral annular toothed driven ring gear for mating with a toothed drive gear of the winch. The molded plastic sheave component is attached to a second sheave side plate, which may be metal, to form the two-piece sheave assembly. Apertures for the winch drive shaft and the pivotable cable end fitting are integrally molded in the first sheave component.

7 Claims, 2 Drawing Sheets

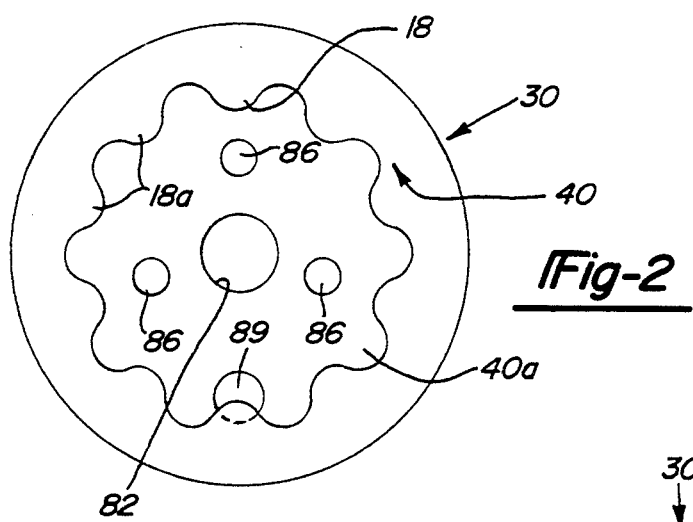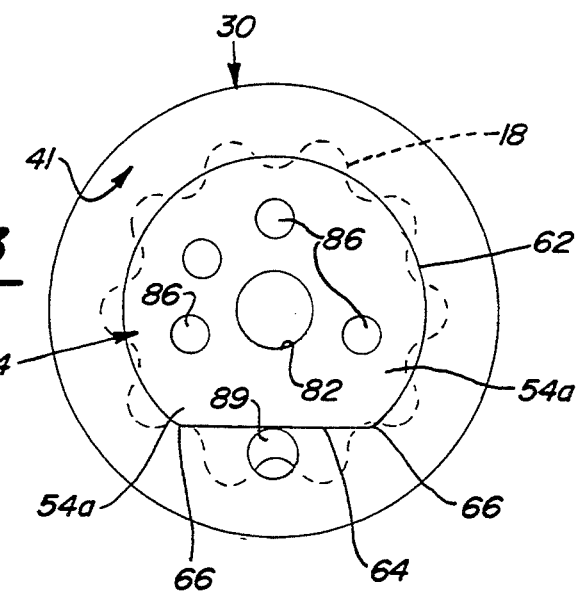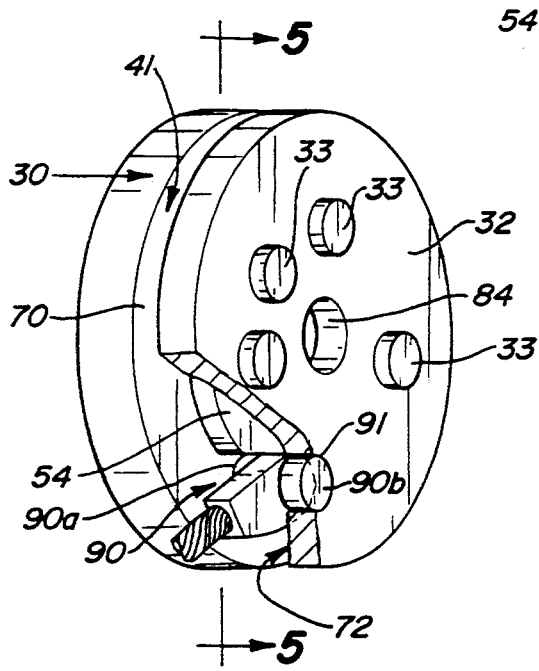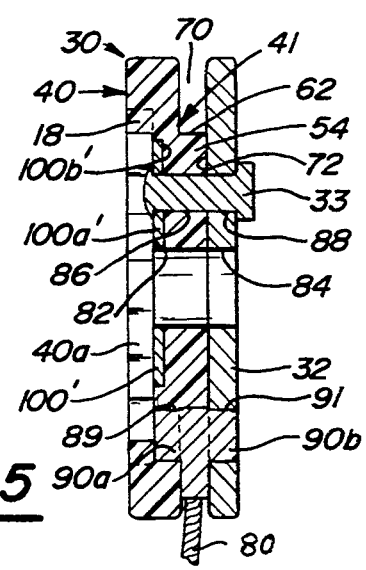

SHEAVE ASSEMBLY FOR A TIRE LIFT/CARRIER WINCH

This application is a continuation of application Ser. No. 07/728,815, filed Jul. 11, 1991, now abandoned, which is a continuation of Ser. No. 07/369,103, filed Jun. 21, 1989, and now abandoned.

FIELD OF THE INVENTION

The invention relates to a winch especially useful for a tire lift/carrier and, in particular, to an improved sheave assembly for use in such a winch.

BACKGROUND OF THE INVENTION

Compact vehicle tire lift/carrier winch mechanisms have been used in the past to store a spare tire beneath a vehicle such as an automobile, truck and the like.

U.S. Pat. No. 4,059,197 issued Nov. 22, 977, to Iida, U.S. Pat. No. 4,535,973 issued Aug. 20, 1985 to Dorr et al, U.S. Pat. No. 4,544,136 issued Oct. 1, 1985 to Denman et al and U.S. Pat. No. 4,625,947 issued Dec. 2, 1986, to Denman et al disclose compact winch mechanisms for tire lift/carriers wherein an eccentric gear arrangement is employed to provide a mechanical advantage in driving the sheave assembly of the winch in rotation to wind or unwind the cable connected to the spare tire carrier frame.

In these patented winch mechanisms, the sheave assembly typically includes a pair of sheave side plates maintained in spaced apart relation by suitable fasteners such as rivets and a sheave center plate having a peripheral edge forming a cable-wrapping track on which the cable is wrapped or unwrapped depending upon the direction of rotation of the sheave assembly. The spacing between the sheave side plates is selected to cause the cable to wind or wrap on itself as the sheave assembly is rotated. An annular driven gear is typically press fit in driving relation to one of the sheave side plates. Gear teeth on a reciprocable torque arm mesh with gear teeth on the annular driven gear to rotate the sheave assembly.

The winch cable typically is attached to the sheave assembly by affixing an enlarged cylindrical sheave member onto the cable end and forming side-by-side apertures in the sheave side plates and the sheave center plate to receive the enlarged sheave member affixed on the cable end. In particular, the enlarged sheave member is dimensioned to extend into apertures in the sheave side plates and to ride on rims of the side plates defining the apertures therein as the sheave assembly is rotated.

Copending U.S. patent application Ser. No. 170,281 of common assignee discloses a sheave assembly for a tire lift/carrier winch wherein the sheave center plate is molded, such as die cast, about an end of the winch cable to form a unitary sheave center plate and cable subassembly that simplifies manufacture and assembly of the tire lift/carrier winch.

Copending U.S. patent application Ser. No. 270,270 of common assignee describes a sheave assembly for a tire lift/carrier winch wherein the cable end fitting is rotatably mounted between the sheave side plates and includes an exterior, arcuate, cable-wrapping shoulder that is generally contiguous with the cable-wrapping track on the center sheave plate when the cable end fitting is in a "cable wrap/unwrap" position. When the sheave is rotated in the proper wrap direction, the cable is wrapped initially on the cable-wrapping shoulder and the cable-wrapping track and then onto itself.

In the manufacture of compact tire lift/carrier winches, it would be desirable to reduce the number and complexity of the components of the sheave assembly as well as the drive train. It would also be desirable to simplify the assembly of the tire lift/carrier winch. It would further be desirable to reduce the cost of the tire lift/carrier winch.

SUMMARY OF THE INVENTION

The invention contemplates a sheave assembly for a compact tire lift/carrier winch that fulfills these desires.

The invention contemplates a first sheave component molded as one piece in such a manner as to form a first sheave side plate and an integral center sheave hub. A second sheave side plate is attached to the first sheave component, in particular, to the center sheave hub, to provide a two-piece sheave assembly for a compact tire lift/carrier winch.

The invention also contemplates a first sheave component molded as one piece in such a manner as to form a first sheave side plate with an integral annular driven ring gear on one side thereof and an integral center sheave hub on the other side thereof. The second sheave plate is attached to the center sheave hub to provide a two-piece sheave assembly with an integral annular driven gear.

In a typical working embodiment of the invention, the first sheave component is a molded plastic, one-piece component including a first sheave side plate of a given radius relative to the axis of rotation of the winch drive shaft and an integral sheave center hub extending axially from the side plate and terminating in an axial end. The hub is molded to include a circumferential cable-wrapping track defined by a radius (relative the axis of rotation of the winch drive shaft) smaller than the radius of the first sheave side plate. An annular driven ring gear is preferably molded integrally on a side of the first sheave side plate opposite from the hub. A second metal sheave side plate is fastened adjacent the axial end of the hub by suitable fasteners such that an annular cable-receiving space is formed about the cable-wrapping track. Apertures for pivotally receiving the cable end fitting as well as the drive shaft of the winch are molded integrally into the first sheave component.

BRIEF DESCRIPTION OF THE DRAWINGS

FIG. 2 is a side elevation of the first sheave component showing the annular driven ring gear molded integrally therein.

FIG. 3 is a side elevation of the first sheave component showing the center sheave hub with the cable-wrapping track molded therein.

FIG. 4 is a partially broken-away perspective view of the sheave assembly and cable end fitting between the sheave side plates.

FIG. 5 is a cross-sectional view of another embodiment of the invention showing a metal plate embedded in the outer side of the first sheave component.

DETAILED DESCRIPTION OF THE INVENTION

Figure 1:
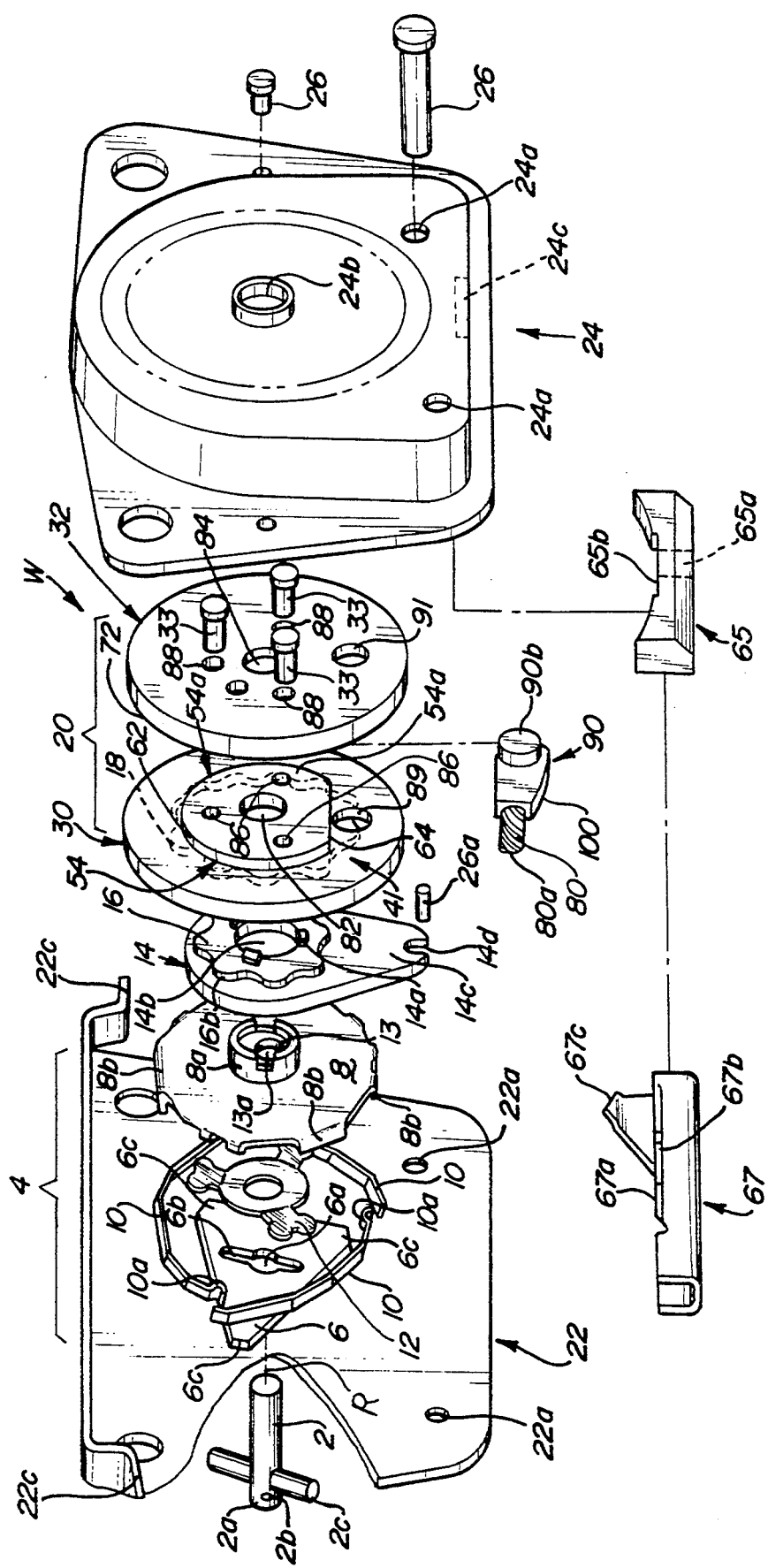
FIG. 1 is an exploded view of a tire lift/carrier winch in accordance with the invention with the cable end fitting shown enlarged in size relative to the sheave components.

Referring to FIG. 1, a tire lift/carrier winch W in accordance with the invention is shown including a drive shaft 2 rotatable about axis R, a torque limiting assembly (overload clutch) 4 having a drive plate 6 and a driven plate 8 with springs 10 thereon. The winch also includes an eccentric cam 13, a torque arm 14 with a driving gear 16 attached thereon by bent tabs 14a of the torque arm, and a two-piece sheave assembly 20 of the invention to be described in further detail hereinbelow. These winch components are disposed in operative side-by-side relation on the drive shaft 2 between the opposing housing plates 22,24 that are connected together by suitable means, such as rivets 26, to enclose the winch components. Each housing plate 22,24 includes rivet-receiving holes 22a,24a to this end.

Each housing plate 22,24 includes respective coaxial apertures (only aperture 24b shown) to rotatably receive the opposite ends of the drive shaft 2 in a manner known in the art. One end 2a of the drive shaft 2 extends outside the housing plate 22 when the winch components are assembled and includes a cross bore 2b by which the drive shaft 2 can be rotated to lift or lower a vehicle tire carrier (not shown).

The drive shaft 2 extends through an opening 6a in the drive plate 6 and includes a diametral pin 2c received in driving relation in the cross slot 6b of the drive plate 6. The drive shaft 2 also extends through the opening 13a of the eccentric cam 13.

The driven plate 8 includes a cylindrical hub 8a extending axially toward the torque arm 14. The hub 8a receives and is keyed to the eccentric cam 13 which has diametral keys received in hub keyways, FIG. 1. The hub 8a and the cam 13 have coaxial centers or axes offset from the rotational axis R of the drive shaft 2. The center or axis of the opening 13a in the cam 13 is coaxial with axis R to receive the drive shaft 2.

The torque arm 14 includes an opening 14b receiving the hub 8a and the eccentric cam 13 therein and includes an extension 14c having an elongate slot 14d. The elongate slot 14d receives the intermediate shaft 26a of one of the rivets 26 holding the housing plates 22,24 together. The slotted extension 14c and intermediate shaft 26a of the rivet cooperate to impart oscillitory motion to the torque arm 14 and driving gear 16 thereon in known manner when the drive shaft 2 is rotated. When the drive shaft 2 is rotated, the drive plate 6 and driven plate 8 rotate about the axis of rotation R with hub 8a and the cam 13 rotating eccentrically about axis R by virtue of their centers or axes being offset relative to axis R.

In the winch shown in FIG. 1, rotation of the drive shaft 2 causes oscillation of the driving gear 16 as controlled by reciprocation of slotted extension 14c of the torque arm 14 relative to the intermediate rivet shaft 26a and a corresponding driving of an annular driven gear 18 in rotation about axis R. The annular driven gear 18 in turn drives the sheave assembly 20 in rotation to wind the cable 80 on the central hub 54 when the sheave assembly 20 is rotated clockwise and to unwind the cable when the sheave assembly is rotated counterclockwise. A gear train of this general type and its operation are shown in the aforementioned U.S. Pat. No. 4,059,197, the teachings of which are incorporated by reference.

A cable guide member 65 is disposed in the housing plates 22,24 when the winch components are assembled. In particular, the cable guide 65 includes a slot 65a aligned with a slot 24c in the bottom wall of the housing plate 24. The cable 80 extends through these slots outside the housing toward the vehicle spare tire carrier (not shown).

An anti-reverse pawl 67 is also provided in the winch construction and includes a forked arm 67a with a slot 67b. The forked arm overlies flat surface 65b on the guide member 65 such that the slot 67b straddles the slot 65a. The cable 80 passes through the slot 67b as it exits or enters the winch W through the aforementioned slots 24c,65a. The pawl 67 also includes a pawl arm 67c which is adapted to engage the axially extending spring retaining tabs 8b on the driven plate 8 to prevent excessive rotation of the sheave assembly 20 in the unwind direction (counterclockwise rotation) and to prevent rewinding of the sheave assembly 20 in the wrong direction as fully explained in U.S. Pat. No. 4,535,973, the teachings of which are incorporated herein by reference.

The anti-reverse action of the pawl 67 is supplemented by cooperative engagement of the pivotable cable end fitting 90 and the shoulder 64 of the cable wrapping track 62 molded on the hub 54 as explained in U.S. Pat. No. 5,125,628, issued Jun. 30, 1992, entitled "Sheave And Cable Assembly For A Tire Lift/Carrier Winch" of common assignee herewith, the teachings of which are incorporated herein by reference.

The torque limiting assembly (overload clutch) 4 allows the drive shaft 2 to free wheel in the event the cable 80 is subjected to an overload situation, such as in the event the tire lift/carrier has been fully lifted to it final position or obstructed in its movement for some reason. In particular, the drive shaft 2 is keyed to the drive plate 6 by the diametral pin 2c on the drive shaft. When an overload condition exists, the springs 10 deflect radially outwardly to permit free wheeling of the drive shaft 2. Allowing the drive shaft 2 to free wheel in such situations protects the other components of the winch from damage. In normal operation when the cable 80 is not subjected to an overload, drive portions 6c of the drive plate 6 drivingly engage the U-shaped driven ends 10a of the springs 10 to thereby drive the driven plate 8 in rotation. Such a torque limiting assembly (overload clutch) is described in U.S. Pat. No. 5,027,933, issued Jul. 2, 1991, entitled "Clutch For Tire Lift/Carrier Winch" and of common assignee herewith, the teachings of which are incorporated herein by reference.

A friction spring 12 may be provided between the drive plate 6 and the driven plate 8 to provide supplemental friction in the winch for hindering unwinding of the cable and release of the tire carrier (not shown) from a stowed position on the vehicle as a result of vibrations during use on the vehicle.

The winch W is attached to the bottom of a vehicle by attachment flanges 22c on the housing 22 and by suitable fasteners (not shown) extending through holes provided in the flanges 22c.

The two-piece sheave assembly 20 of the invention includes a molded plastic, one-piece first sheave component 30 and second sheave side plate 32 fastened together by suitable fasteners, such as a plurality of rivets 33. The first sheave component 30 is molded as one piece to include an outer side or face 40 facing the torque arm 14 and an inner side or face 41 facing in the opposite direction. The outer side 40 includes the annular driven ring gear 18 molded integrally about the periphery thereof. The peripheral driven ring gear 18 defines a central recess 40a for receiving the driving gear 16 attached on the torque arm 14. The driven ring gear 18 includes inwardly, radially extending gear teeth 18a that mesh with the outer teeth 16b of the driving gear 16.

The inner side 41 of the first sheave component 30 includes a generally cylindrical center hub 54 extending axially toward the second sheave side plate 32 and terminating in a flat, axial end 54a. The central hub 54 constitutes a center sheave plate of the sheave assembly 20 when the first sheave component 30 and the second sheave side plate 32 are fastened together with the latter abutting the axial end 54a. In particular, the central hub 54 includes an outer peripheral surface defining the arcuate (constant radius) cable-wrapping track 62 and an exterior, planar, chordal shoulder 64 truncating the cable-wrapping track 62 for reasons explained in aforementioned U.S. Pat. No. 5,125,628. The cable-wrapping track 62 and the exterior shoulder 64 intersect and are blended together by arcuate transition portions 66.

The central hub 54 includes the flat, axial end 54a adjacent and against which the inner side face 72 of the second sheave side plate 32 abuts when the first sheave component 30 and the second sheave side plate 32 are fastened together. When the first sheave component 30 and the second sheave side plate 32 are fastened together, sides 41 and 72 are in spaced, parallel facing relation to form a peripheral cable-receiving channel 70 about the cable-wrapping track 62.

As is apparent from the Figures, the radii of the first sheave component 30 and the second sheave side plate 32 relative to the axis of rotation R are generally equal and greater than the radius of the central hub 54 to form the narrow channel 70 between the facing side surfaces 41,72 and around the cable-wrapping track 62 (formed on hub 54) to receive the cable 80 such that it initially wraps on the cable-wrapping track 62 and then on itself as the sheave assembly 70 is rotated about axis R. To this end, the axial length of the central hub 54 is selected to provide channel 70 between the facing surfaces 41,72 to receive the width of the cable 80.

The first sheave component 30 includes a central aperture 82 molded integrally therein and axially aligned with a similar aperture 84 of the second sheave plate 32 to receive the drive shaft 2 in bearing relation thereon. The first sheave component 30 includes three circumferentially spaced passages 86 molded therein in axial alignment with similar passages 88 in the second sheave side plate 32. Passages 86,88 are adapted to receive the fasteners, such as the rivets 33, for holding the first sheave component 30 and the second sheave side plate 32 together as described hereinabove.

The first sheave component 30 also is molded to include an aperture 89 adjacent the shoulder 64 to rotatably receive one ear 90a of the cable end fitting 90. The second sheave side plate 42 includes an aperture 91 coaxially aligned with aperture 89 to rotatably receive the other ear 90b of the cable end fitting 90 for reasons explained in aforementioned copending application Ser. No. 270,270.

In operation, the sheave assembly 20 is rotated counterclockwise to wrap the cable 80 on the cable-wrapping track 62 of the central hub 54 and the cable-wrapping shoulder 100 of the end fitting 90 to raise a load, such as a tire lift/carrier, attached to the end 80a to an elevated storage position on a vehicle. To lower the load, the sheave assembly 20 is rotated counterclockwise to pay out the cable 80 from the sheave assembly 20. The winch W is designed to return (raise) the load to its original elevated storage position on the vehicle by rewinding the cable 80 on the cable-wrapping track 62 and shoulder 100 by clockwise rotation of the sheave assembly 20. As mentioned hereinabove, the anti-reverse pawl 67 is operable to prevent rewinding of the cable 80 on the track 62 by rotation of the sheave assembly in the "wrong" direction (i.e., the counterclockwise direction of rotation) normally used to unwrap the cable.

As those skilled in the art will appreciate, the first sheave component 30 greatly simplifies the construction of the sheave assembly 20 in that it replaces at least three separate components (i.e., a separate annular driven ring, a separate sheave side plate and a separate sheave center plate) heretofore used in compact tire lift/carrier winches; e.g., see U.S. Pat. Nos. 4,059,197; 4,535,973; 4,544,136 and 4,625,947. The overall size of the compact tire lift/carrier winch W can thereby be reduced. Assembly of the sheave assembly 20 is greatly facilitated since only the first and second side member 30,32 must be properly aligned and fastened together by rivets 33 or other means.

Preferably, the first sheave component 30 comprises molded plastic (e.g., glass reinforced nylon). Materials other than plastic and processes other than plastic molding can be used to form the first side member 30, however. The second sheave side plate 32 preferably comprises a metal plate formed (e.g., stamped) with the features described hereinabove and shown in the drawings, although it may comprise a molded plastic or other formed component.

FIG. 5 illustrates another embodiment of the invention similar to that of FIGS. 1–4 but including an annular metal plate 100' embedded in the outer side 40 of the first sheave component 30 by virtue of the latter being molded in-situ against the former in a mold cavity (not shown). The metal plate 100' is included to provide an exposed outer surface 100a' against which the heads of rivets 33 seat and prevent loosening of the rivets 33 in service. The heads on the opposite ends of the rivets 33 seat against the metal sheave side plate 42 for this same purpose. An inner surface 100b' of the metal plate 100' is embedded in the first sheave component 30 as a result of the latter being molded in-situ against the former.

The invention provides a sheave assembly 20 which is of smaller two-piece construction, simpler to assemble and lower in cost as compared to sheave assemblies used heretofore in compact size tire lift/carrier winches. Moreover, the invention provides a two-piece sheave assembly preferably having an annular driven ring gear molded integrally with the first sheave component, although a separate driven ring gear may be employed.

While the invention has been described in terms of specific embodiments thereof, it is not intended to be limited thereto but rather only to the extent set forth hereafter in the following claims.

We claim:

1. A sheave assembly for a tire lift/carrier winch, comprising:
    (a) a first sheave component molded as one piece to include a first sheave side plate having a first side and a second side facing oppositely from said first side, an annular ring gear molded integrally on said first side and a hub portion molded integrally on said second side, said hub portion extending axially from said second side and terminating in an axial end, said hub portion having a circumferential cable-wrapping track molded thereon, (b) a metal plate disposed on said first side of said first sheave side plate inwardly of said annular ring gear, (c) a second sheave side plate disposed adjacent said axial end, said first sheave side plate and second sheave side plate forming an annular cable-receiving space about said cable-wrapping track, and (d) means for attaching the first sheave component and second sheave side plate together with the second sheave side plate disposed adjacent said axial end.

2. The sheave assembly of claim 1 wherein said metal plate includes an outer side and an inner surface embedded in said first axial side as a result of said sheave component being molded in situ against said metal plate.

3. The sheave assembly of claim 2 wherein said metal plate, hub portion and second sheave plate include axially aligned passages to receive said attaching means.

4. The sheave assembly of claim 3 wherein said attaching means comprises a rivet having a head disposed against the metal plate and an opposite head disposed against the second sheave side plate.

5. A molded plastic sheave component for a tire lift-/carrier winch, said sheave component including a sheave side plate portion with a first side and a second side facing oppositely from the first side, an annular driven ring gear molded integrally on said first side, a metal plate embedded in said first side inwardly of said annular driven ring gear, and an axially extending hub portion molded integrally on said second side and having a circumferential cable-wrapping track molded thereon.

6. A sheave component for a tire lift/carrier winch, comprising:

(a) a molded plastic, one-piece sheave plate having a first side and a second side facing oppositely from said first side and having an integrally molded hub portion extending axially from said second side, said hub portion having a circumferential cable-wrapping track molded thereon, and (b) a metal plate disposed on said first side of said sheave plate, said metal plate having an outer side and an inner side embedded in said first side as a result of said sheave plate being molded in situ against said metal plate.

7. The assembly of claim 6 wherein said metal plate and said hub portion include axially aligned passages for receiving a fastener therethrough.

* * * * *